(12) United States Patent
Bruckner et al.

(10) Patent No.: US 7,676,524 B2
(45) Date of Patent: Mar. 9, 2010

(54) HIERARCHICAL CURSOR-BASED OBJECT MODEL

(75) Inventors: Robert M. Bruckner, Redmond, WA (US); Fang Wang, Redmond, WA (US); Christopher A. Hays, Monroe, WA (US); Jason D. Carlson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 299 days.

(21) Appl. No.: 11/669,784

(22) Filed: Jan. 31, 2007

(65) Prior Publication Data

US 2008/0183735 A1 Jul. 31, 2008

(51) Int. Cl.
*G06F 17/30* (2006.01)
(52) U.S. Cl. ............... 707/805; 707/999.003; 707/999.101; 707/999.103
(58) Field of Classification Search ...... 707/1, 707/10, 100, 101, 102, 104.1; 715/234, 815
See application file for complete search history.

(56) References Cited

U.S. PATENT DOCUMENTS

| | | | |
|---|---|---|---|
| 6,044,217 A | 3/2000 | Brealey et al. | |
| 6,507,833 B1 | 1/2003 | Hichwa et al. | |
| 6,721,745 B2 | 4/2004 | Monestere, III | |
| 6,938,050 B2 * | 8/2005 | Le et al. | 707/103 R |
| 7,015,911 B2 | 3/2006 | Shaughnessy et al. | |
| 7,051,038 B1 | 5/2006 | Yeh et al. | |
| 7,058,905 B2 | 6/2006 | Guerrero | |
| 7,143,100 B2 * | 11/2006 | Carlson et al. | 707/101 |
| 7,370,273 B2 * | 5/2008 | Beyer et al. | 715/210 |
| 2004/0193644 A1 | 9/2004 | Baker et al. | |
| 2005/0278615 A1 | 12/2005 | Wang et al. | |
| 2005/0283494 A1 * | 12/2005 | Colossi et al. | 707/102 |
| 2006/0005116 A1 | 1/2006 | Ferguson et al. | |

FOREIGN PATENT DOCUMENTS

| | | |
|---|---|---|
| KR | 1020030047895 A | 6/2003 |
| KR | 1020050039549 A | 4/2005 |

OTHER PUBLICATIONS

International Search Report for PCT Application No. PCT/US2008/051884, dated Jun. 27, 2008, 10 pages.
StimulReport.Net. http://www.dirfile.com/stimulreport_net.htm. Last accessed Nov. 27, 2006.
Chris Sully. An Introduction to SQL Server Reporting Services I . . . Feb. 19, 2005. http://www.dotnetjohn.com/articles.aspx?articleid=184. Last accessed Nov. 27, 2006.

* cited by examiner

*Primary Examiner*—Tim T. Vo
*Assistant Examiner*—Dangelino N Gortayo
(74) *Attorney, Agent, or Firm*—Workman Nydegger

(57) ABSTRACT

An object data manipulation system is provided. The system includes a definition object model that includes a set of dynamic group definitions over a data hierarchy. A cursor component points to a subset of the data hierarchy, where the subset is loaded into memory for further processing.

14 Claims, 10 Drawing Sheets

Tablix Definition:

|  | =Year(Fields!O... | |
|---|---|---|
|  | =MonthName(... | Total |
| =Fields!Country | =Fields!Region | =Count(Fields!C... | =Count(Fields!C... |

Tablix Instance with Cursors and Sliding Window:

| | | 1995 | | | 1996 | |
|---|---|---|---|---|---|---|
| | | November | December | Total | January | February |
| USA | CA | 2 | 0 | 2 | 0 | 3 |
| | ID | 4 | 0 | 4 | 7 | 2 |
| | ID | 7 | 0 | 7 | 7 | 6 |
| | WY | 4 | 0 | 4 | 2 | 0 |
| | NM | 0 | 2 | 2 | 4 | 2 |
| | MT | 0 | 2 | 2 | 0 | 0 |
| | OR | 0 | 2 | 2 | 2 | 2 |
| | AK | 0 | 0 | 0 | 6 | 0 |
| France | | 13 | 12 | 25 | 21 | 9 |
| Brazil | SP | 7 | 9 | 16 | 9 | 9 |
| | RJ | 0 | 5 | 5 | 5 | 8 |
| Germany | | 4 | 16 | 20 | 24 | 9 |
| UK | | 6 | 12 | 18 | 2 | 6 |
| | Isle of Wight | 3 | 2 | 5 | 4 | 0 |
| Sweden | | 3 | 7 | 10 | 9 | |
| Venezuela | Nueva... | 3 | 0 | 3 | 8 | |

FIG. 2

Tablix Definition:

← 310

| [=Prod] | [=Year] | | Total (Static) | |
|---|---|---|---|---|
| | Qty | Amt | Qty | Amt |
| | Sum(Qty) | Sum(Amt) | Sum(Qty) | Sum(Amt) |

↖ 300

Tablix Instance / Sliding Window:

← 320

| | 2005 | | 2006 | | Total | |
|---|---|---|---|---|---|---|
| | Qty | Amt | Qty | Amt | Qty | Amt |
| Table | 10 | 120 | 12 | 160 | 22 | 280 |
| Chair | 4 | 85 | 2 | 35 | 6 | 120 |

FIG. 3

HIERARCHICAL CURSOR-BASED OBJECT MODEL

BACKGROUND

Computational and memory demands on computing systems continue to increase exponentially as technology develops newer and ever more powerful applications. One such area that has seen recent growth relates to requirements that database processing technologies that deal with dimensional aspects such as row and column processing are now being coupled with other models such as traditional object models having a class/inheritance structure. Thus, many systems often have a need to support both relational database models and object based models where there also needs to be methods in place to bridge the gap between these models. Demands to support such systems are often placed on available operating systems where a plurality of applications interact with the operating system but employ the system to interact with other applications. Some discussion on these two differing types of models is now provided before a discussion on memory constraints imposed by some applications employing such models.

Object-oriented programming (OOP) is a programming language model organized around "objects" rather than "actions" and data rather than logic. Historically, a program has been viewed as a logical procedure that takes input data, processes it, and produces output data. The programming challenge was seen as how to write the logic, not how to define the data. Object-oriented programming takes the view that what one really is interested in are the objects to manipulate rather than the logic required to manipulate them. Examples of objects range from human beings (described by name, address, and so forth) to buildings and floors (whose properties can be described and managed) down to the display objects on a computer desktop (such as buttons and scroll bars).

One aspect in OOP is to identify the objects to manipulate and how they relate to each other, an exercise often known as data modeling. When an object has been identified, it can be generalized as a class of objects. Then, define the type of data it contains and any logic sequences that can manipulate it. Each distinct logic sequence is known as a method. A real instance of a class is called an "object" or, in some environments, an "instance of a class." The object or class instance is what executes on the computer. The object's methods provide computer instructions and the class object characteristics provide relevant data. In contrast to object models, relational database models are now described.

Common relational database models are often supported by some type of query language for accessing and managing large amounts of data. Structured Query Language (SQL) is a prevalent database processing language and may be the most popular computer language used to create, modify, retrieve and manipulate data from relational database management systems. The language has evolved beyond its original purpose to support object-relational database management systems. In general, SQL was designed for a specific, limited purpose—querying data contained in a relational database. As such, it is a set-based, declarative computer language rather than an imperative language such as C or BASIC which, being general-purpose, were designed to solve a broader set of problems. Language extensions such as PL/SQL bridge this gap to some extent by adding procedural elements, such as flow-of-control constructs. Another approach is to allow programming language code to be embedded in and interact with the database. For example, Oracle and others include Java in the database, and SQL Server 2005 allows languages to be hosted within the database server process, while PostgreSQL allows functions to be written in a wide variety of languages, including Perl, Tcl, and C.

One area where object models and relational models cooperate is in the context of a reporting system or service. Prior art FIG. 8 shows an example prior art reporting system 800 adapted for an SQL/object model system. The system 800 includes a Rendering Object Model (ROM) 810 that receives data from a report snapshot 820 and outputs to a rendering extension component 830. The rendering extension component 830 receives parameters and other settings at 840 and produces a rendered output in a desired format at 850 (e.g., HTML, PDF).

In general, SQL Reporting Services depicted by the system 800 support a report processing and rendering engine that retrieves data and processes the entire report snapshot 820 as a whole. Thereby, the system 800 pre-generates all report item instances (such as textbox properties and values) in an output format independent intermediate format, and stores this information in chunks (i.e., streams of data). The chunks are de-serialized later during report rendering into the Rendering Object Model 810.

The ROM 810 is a representation of a report in an output-format independent object model representation. In the system 800, the ROM 810 is an instance object model allowing random access to all instances within a dynamic group collection. For example, a report matrix with 1000 row group instances and 1000 column group instances results in an overall matrix size of 1,000,000 cell instances. While all cells are directly accessible through the ROM, only a few may actually be needed to render a specific page at 850. The random-access flexibility of the ROM 810 comes with a considerable memory and performance cost. Despite very advanced caching strategies in the ROM 810, the overall object model still consumes a significant amount of memory and provides a lot of flexibility to rendering extensions 830 that is often not needed for efficient report pagination and layout rendering.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

A dynamic object model is provided that conserves memory over traditional models in favor of a controlled presentation, acquisition and consumption of available data. Hierarchical cursors are provided that act on a given data set presented by the object model in an incremental manner and independently across multiple dimensions as opposed to operating on the entire data set in memory as a whole. The cursors act as location pointers across multiple dimensions (e.g., row or column dimensions) in memory that are controlled by a consuming or controlling application of the data set. Based on where the cursors point, a reduced subset of memory is loaded and exposed as the next set of data to be consumed by the controlling application. For instance, an initial subset of data may be pointed to by the cursors, where the subset of data pointed to is loaded into memory for further processing. The controlling application may then request the next subset of data for processing at any given level of a data hierarchy which effectively changes the address of the cursors and determines the next subset of data to be loaded. In effect, the next loading of a data subset is relative to the previous location of the cursors. By operating on datasets in an incremental/relative manner in contrast to the entire data set in absolute terms, memory requirements can be reduced and processing performance enhanced since less data is processed via the subset. It is to be appreciated that the dynamic object model and cursors can support multiple applications where hierarchical data arrangements (e.g., nodes and leaves of the nodes, relational database columns and rows, and so forth).

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 2 is an example output display that illustrates hierarchical cursor and dynamic model functionality.

FIG. 3 is an output display that illustrates a simplified hierarchical cursor and dynamic model functionality.

DETAILED DESCRIPTION

A hierarchical cursor-based object model and data manipulation system is provided to conserve memory and enhance performance of computing applications. In one aspect, an object data manipulation system is provided. The system includes a definition object model that includes a set of dynamic group definitions over a set of data hierarchies. A cursor component points to a subset of the data at each level of each hierarchy, where the subset is loaded into memory for further processing. In another aspect, a respective cursor component can be associated with each dynamic group definition, where the set of cursor components operate over multiple levels of multiple hierarchical dimensions of the data.

As used in this application, the terms "component," "hierarchy," "cursor," "model," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
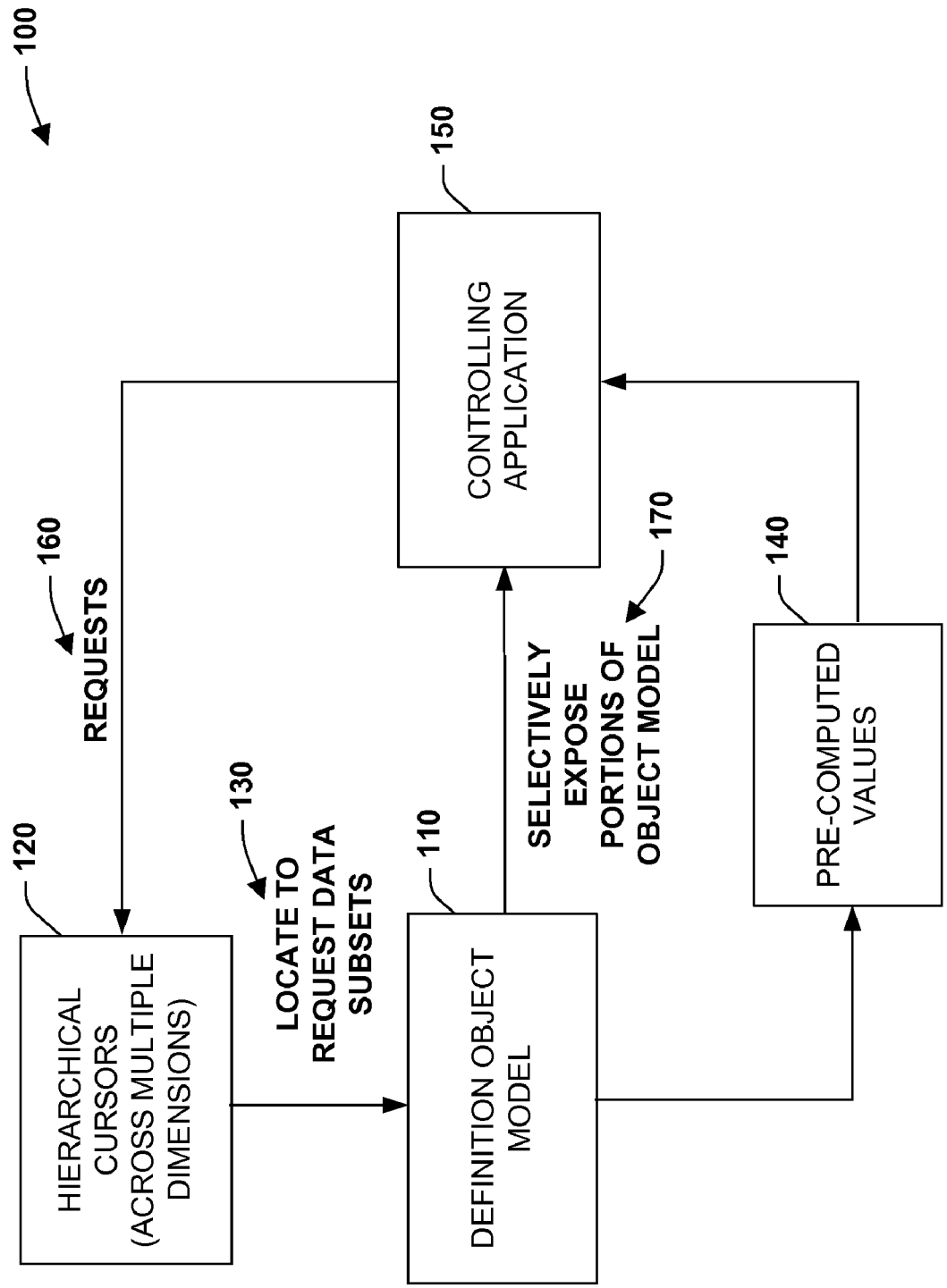
FIG. 1 is a schematic block diagram illustrating a cursor-based object model and data manipulation system.

Referring initially to FIG. 1, a cursor-based object model and data manipulation system 100. The system 100 includes a definition object model 110 that includes a set of dynamic group definitions (or data structures) over a set of data hierarchies. For example, data nodes acting as parent nodes that supply child nodes underneath the parent nodes form one type of multi-dimensional hierarchy. A hierarchical cursor component 110 (also referred to as a cursor component) locates a subset of a data hierarchy at 130, where the subset can be loaded into memory (not shown) for further processing. In one aspect, one cursor component 120 can be associated with each dynamic group definition in the definition object model 110, where the set of cursor components operate over multiple levels of multiple hierarchical dimensions of the data. In another example, the multiple hierarchical dimensions can be associated with row and column dimensions of a database. As shown, a plurality of pre-computed data values 140 can be computed from the definition object model 110, yet only of a portion of the values may be loaded in memory for further processing as controlled by the respective cursor components 120. It is noted that data as used herein (via a definition object model) has multiple dimensions. Generally, each of those dimensions has one hierarchy, where the respective hierarchy has multiple levels (each level is defined via a dynamic group), where the respective level is associated with a single cursor.

A controlling application 150 generates a request for a next data subset from the data hierarchy at 160. For example, the locations or locators at 130 may be initially set to one portion of the data hierarchy and the controlling application 150 can change the location to another subset in the hierarchy via the request 160 for other data. As shown, data portions are selectively exposed at 170 to the controlling application 150 in response to the request. In one example, the controlling application can be a rendering application however it is to be appreciated that any object manipulation that employs dynamic/relative cursor positions and locations to selectively load portions of the definition object model 110 can also be employed.

Generally, the request 160 controls or influences a location of the cursor component 120. It is noted that the cursor component 120 can be changed in accordance with a plurality of techniques including memory pointers and direct memory offsets, for example. Other examples for controlling location 130 include indexes into arrays or linked lists as well as other implementations. Thus, the locations at 130 can be incrementally or relatively changed from a previous location of the cursor component 120. In another aspect, the locations 130 can be changed over a block or range of memory addresses from a previous location of the cursor component 120. If desired, the user can be presented options that control the amount of data that is loaded upon a given request 160 thus allowing the user to control the trade-off between data that is presently available for processing (higher memory requirement) versus incrementally locating the next data subset upon request 160 (higher processing requirement).

The definition object model 110 and cursor component 120 conserves memory over traditional models in favor of a controlled presentation, acquisition and consumption of available data. Hierarchical cursors 120 are provided that act on a given data set presented by the object model 110 in an incremental/relative manner and independently across multiple dimensions as opposed to operating on the entire data set in memory as a whole. The cursor components 120 act as location pointers at 130 across multiple dimensions (e.g., row or column dimensions) in memory that are controlled by a consuming or controlling application 150 of the data set and via the requests 160. Based on where the cursors point at 130, a reduced subset of memory is loaded and exposed at 170 as the next set of data to be consumed by the controlling application 150. For instance, an initial subset of data may be pointed to by the cursors at 130, where the subset of data pointed to is loaded into memory for further processing. The controlling application 150 may then request the next subset of data at 160 for processing at any given level of a data hierarchy which effectively changes the address of the cursors at 130 and determines the next subset of data to be loaded. In effect, the next loading of a data subset is relative to the previous location of the cursors. By operating on datasets in an incremental/relative manner in contrast to the entire data set in absolute terms, memory requirements can be reduced and processing performance enhanced since less data is processed via the subset. It is to be appreciated that the definition object model 110 and cursor components 120 can support multiple applications where hierarchical data arrangements are employed (e.g., nodes and leaves of the nodes, relational database columns and rows, and so forth).

In one specific aspect, the system 100 supports a process wherein an output format independent Rendering Object Model is created based on the definition hierarchy of a report shown at 110. Instance information is exposed based on the individual definition objects. If a definition object 110 has more than one instance, instances are accessed through a hierarchical cursor component 120. This includes a process of hierarchically dependent cursors 120 that provide a "sliding windows" for report item instances as will be shown in more detail below. The respective instance object property values can depend on the current and parent nodes' context as will be described in more detail below.

As noted previously, the process of applying hierarchical cursors is not restricted to a Rendering Object Model or application, but applicable to definition object models in general as will be described in more detail below. In still yet another aspect, a data manipulation system can be provided. This includes means for defining a data set (definition object model 110) over an object hierarchy and means for determining a relative position in the data set (pointers 130). Also, this can include means for locating (cursor components 120) a subset of the data set for further processing.

Referring now to FIG. 2, an example output display 200 illustrates hierarchical cursor and dynamic model functionality. The display 200 shows an example 210 with two dynamic row groups and two dynamic column groups. It is to be appreciated that more or fewer than two rows and/or columns can be processed. Consequently for this example, the dynamic object model exposes four hierarchical cursors (one per dynamic group). In the instance example shown at 220, a "Region" cursor 230 depends on a "Country" cursor 234. If the outer "Country" cursor 234 is moved to a next position (e.g., France, Brazil), the inner dependent "Region" cursor 230 is then reset and can then move forward through all region instances of the parent country instance.

In another aspect, the example in the output display 220 shows static members (e.g., a "Total" column 240 aggregating the months within a particular year instance). Static members can have their own member/heading and cell definition. Therefore, the output display at 220 has two definition cells:

The instance values of a first definition cell 242 depend on the cursor position of all four cursors shown at 230, 234, 240, and 244.

The instance values of a second definition cell 248 depend on row cursor settings 234 and 230 and the outermost column cursor 240 (i.e., year), but not on the month grouping cursor 244 because the "Total" column 240 aggregates all months. It is noted that the shaded cells 230-240 are in memory (when the cursors are in their displayed positions) rather than the entire table 220.

The principle of the runtime behavior of the hierarchical cursor-based object model is also demonstrated by an example 300 shown in FIG. 3, where only a portion of the data is in the object model at a given time. The example 300 of FIG. 3 is simplified compared to FIG. 2 and only has one dynamic row group and one dynamic column group with a subtotal. As shown, a simple definition is illustrated at 310 where an instance is illustrated at 320. As noted previously, other hierarchical arrangements are possible than one or two row/column examples as shown by the examples in FIGS. 2 and 3. In this specific example at 320, product instances of a table and a chair are displayed for the respective years 2005 and 2006. This includes quantities sold along with an amount for the respective quantities. Similar to FIG. 2, a static total column is illustrated.

Referring back to FIG. 2, various features are illustrated that include the ability to calculate the instances of a particular dynamic group fully on-demand as will be described in more detail with respect to FIG. 7. This reduces the storage requirements for a report snapshot (if a rendering application) and thereby minimizes the computational cost for serialization and de-serialization. As noted previously, rendering applications are but one example of hierarchical cursor based object manipulations. With respect to a rendering application particularly, for most report pagination and rendering decisions, access to all members of a collection of dynamic group instances is not necessary—only to an ordered sequence and subset of the total number of items since rendering is usually performed in sections (pages). For these applications, forward-only cursors are sufficient. For certain rendering applications, however, absolute positioning of the cursors may be needed (e.g., in the case of restarting a rendering from midway through a document). The ability to directly position a cursor to a known location is provided as an option for such applications.

For example, given the output display 220 of FIG. 2, all data for "USA" 234 may fit on a first page. Data for France to Sweden below USA 234 may fit on the second page. Thus, rendering the first page should not require accessing the data instance for Venezuela. The hierarchical cursor-based object model takes advantage of these intrinsic hierarchical dependencies in order to facilitate on-demand report processing and minimize the average memory consumption. It is noted that this method of cursor and movement is not restricted to cultures with top-bottom, left-right writing mode. It applies the same way for right-left writing mode (e.g., Arabic). As can be appreciated, forward-only, absolute and even relative positioning can be provided in a plurality of different directions such as in a diagonal direction across the display 220 for example.

Figure 4:
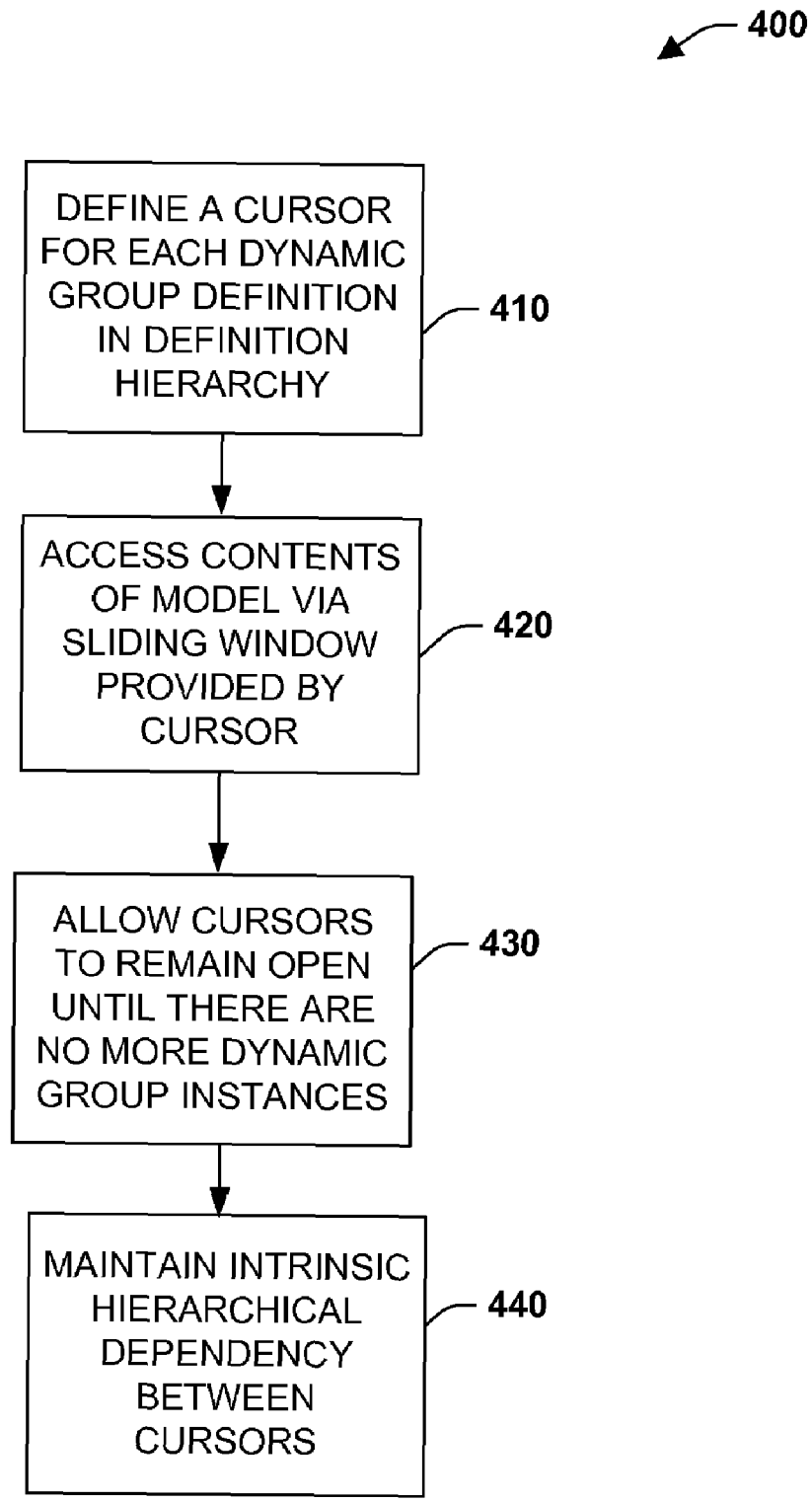
FIG. 4 is a flow diagram that illustrates a process for hierarchical cursor and data model manipulation.

FIG. 4 illustrates exemplary processes 400 for hierarchical cursor and object manipulation. While, for purposes of simplicity of explanation, the process is shown and described as a series or number of acts, it is to be understood and appreciated that the subject processes are not limited by the order of acts, as some acts may, in accordance with the subject processes, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject processes described herein.

As noted above with respect to FIG. 1, a rendering object model (or other type) can be based on a definition object model. Unlike an instance object model, the definition object model size generally only depends on the size of the report definition, but not on the amount of data being processed, report item instances generated, or the final report size.

In order to expose instance information through the definition-based object model, a technique similar to database cursors can be applied to the hierarchical report definition-based object model. The following process 400 describes one possible process for hierarchical cursors.

At 410, define at least one cursor for each dynamic group definition. Generally, there is one cursor for every dynamic group definition within each definition hierarchy. At 420, employ the cursor to provide a sliding window into the model. Thus, each cursor can provide a sliding window into the full report contents. By moving the cursors forward recursively (from the leaf nodes to the root of the hierarchical object model), all instances of the report contents can be accessed.

At 430, cursors are kept open until there are no further dynamic instances. Generally, all cursors can be "open" at all times. They can be reset to the beginning and moved in a forward-only way until there are no more dynamic group instances (or optionally directly positioned). At 440, a hierarchical dependency is maintained between cursors. Since there is an intrinsic hierarchical dependency between the cursors, moving a cursor at an upper level in the hierarchy essentially "leapfrogs" the sliding window for inner cursors. It is noted that acts 410, 430, and 440 are distinctive for the hierarchical cursor-based object model compared to traditional database cursors.

The efficiency of the dynamic object model can be further improved by combining the hierarchical definition-based object model with on-demand report processing (such as described below with respect to FIG. 7) at the point in time when particular property values are accessed by a rendering extension, for example. This reduces the computational cost during report processing and rendering significantly.

Figure 5:
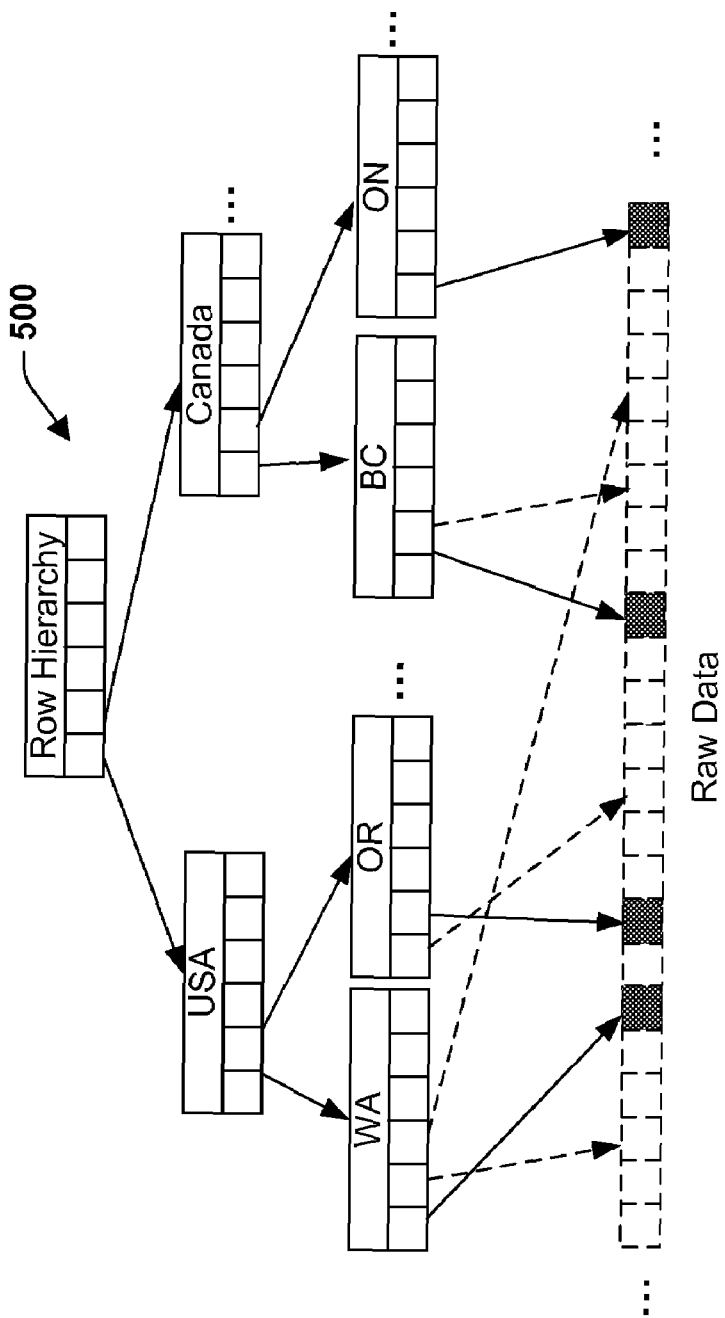
FIGS. 5-6 illustrate example memory usage schemes for different data model situations.

Referring now to FIG. 5, a sample group instance tree 500, calculated during of Group/Sort/Filter/Aggregate phase of report processing is illustrated. What is noteworthy about the tree 500 is that the entire contents of the tree are stored in memory since hierarchical based cursors have not been applied, and thus significant memory is consumed. Each level of grouping contains a number of group instances, each of which contains subgroup instances. At the lowest level of the tree, group instances contain references to individual rows of data. The entire group instance tree 500 is kept in memory at all times and thus the memory overhead can be observed. As will be shown in FIG. 6, when hierarchical cursor based principles are applied, only a fraction of the tree 500 need be maintained in a memory.

Figure 6:
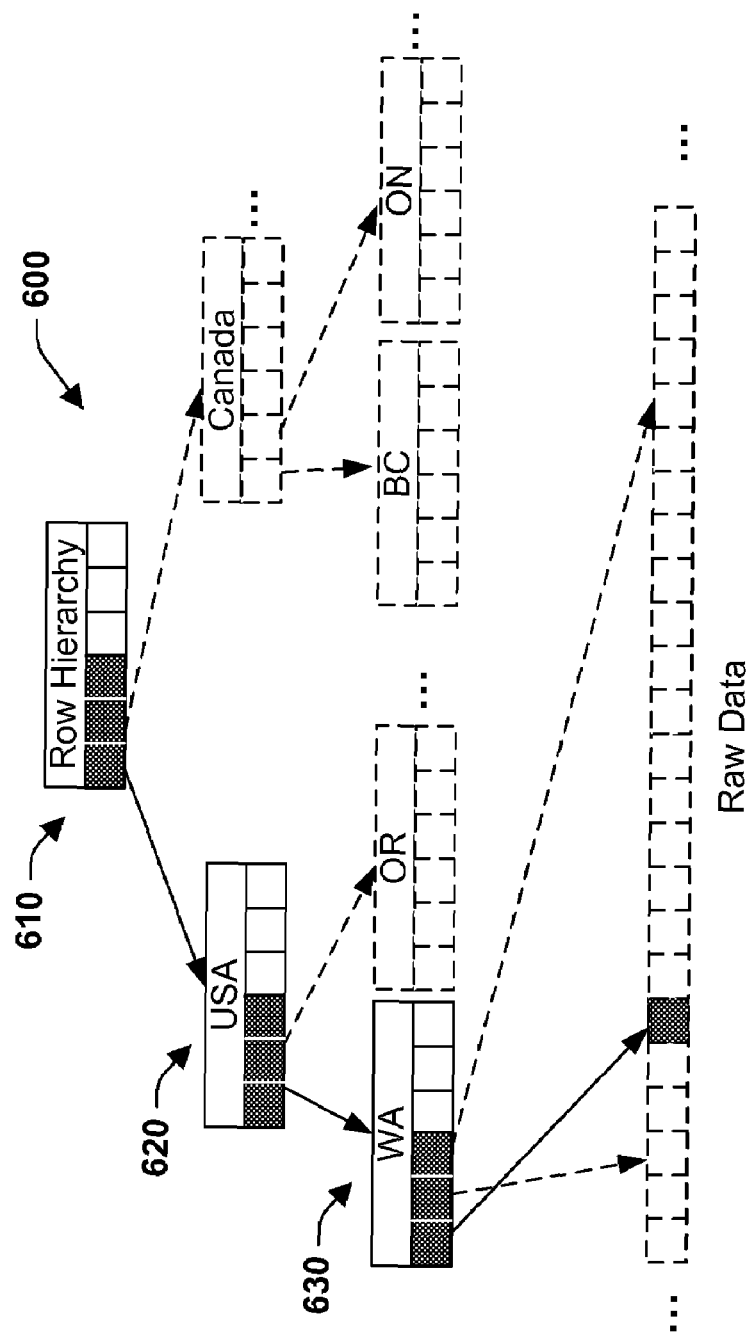

Turning to FIG. 6, an example group instance tree 600 is illustrated and has similar data to the output display depicted in FIG. 5. While the entire group instance tree 600 is calculated, it is decomposed into chunks of data (one per tree node) which are flushed to a temporary snapshot upon creation. When the entire group instance tree 600 has been built, the bulk of the tree remains in the snapshot at runtime—only one instance per level of grouping is required to be in memory at any one time such as shown at 610, 620, and 630. Instances are loaded on-demand based on the instances requested by the renderer (via manipulating the hierarchical cursors) in this example. For nodes with large numbers of children, child lists can be segmented, employing a single segment of child pointers for each group level to be in memory.

Figure 7:
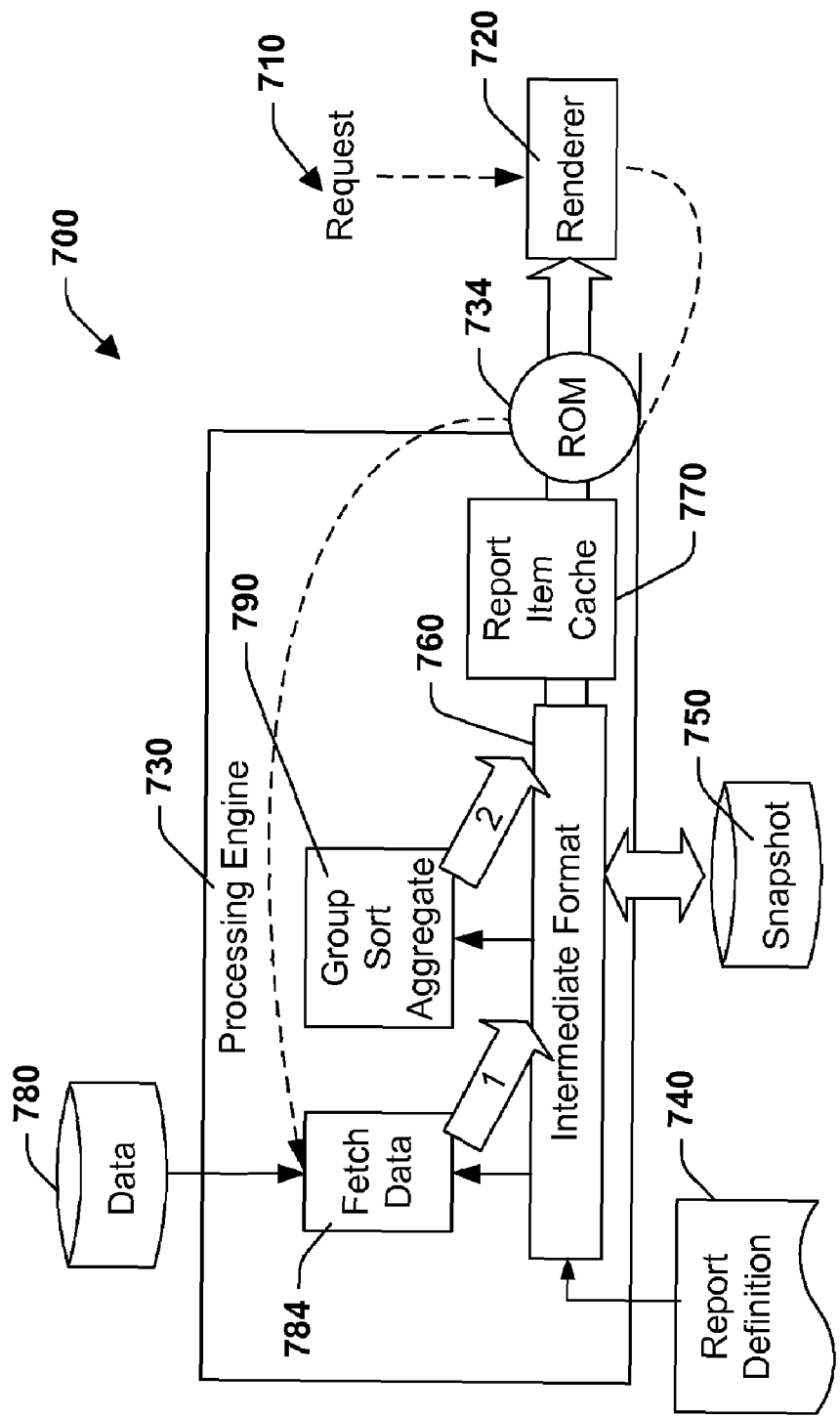
FIG. 7 is an example rendering architecture that employs hierarchical based cursors.
Figure 8:
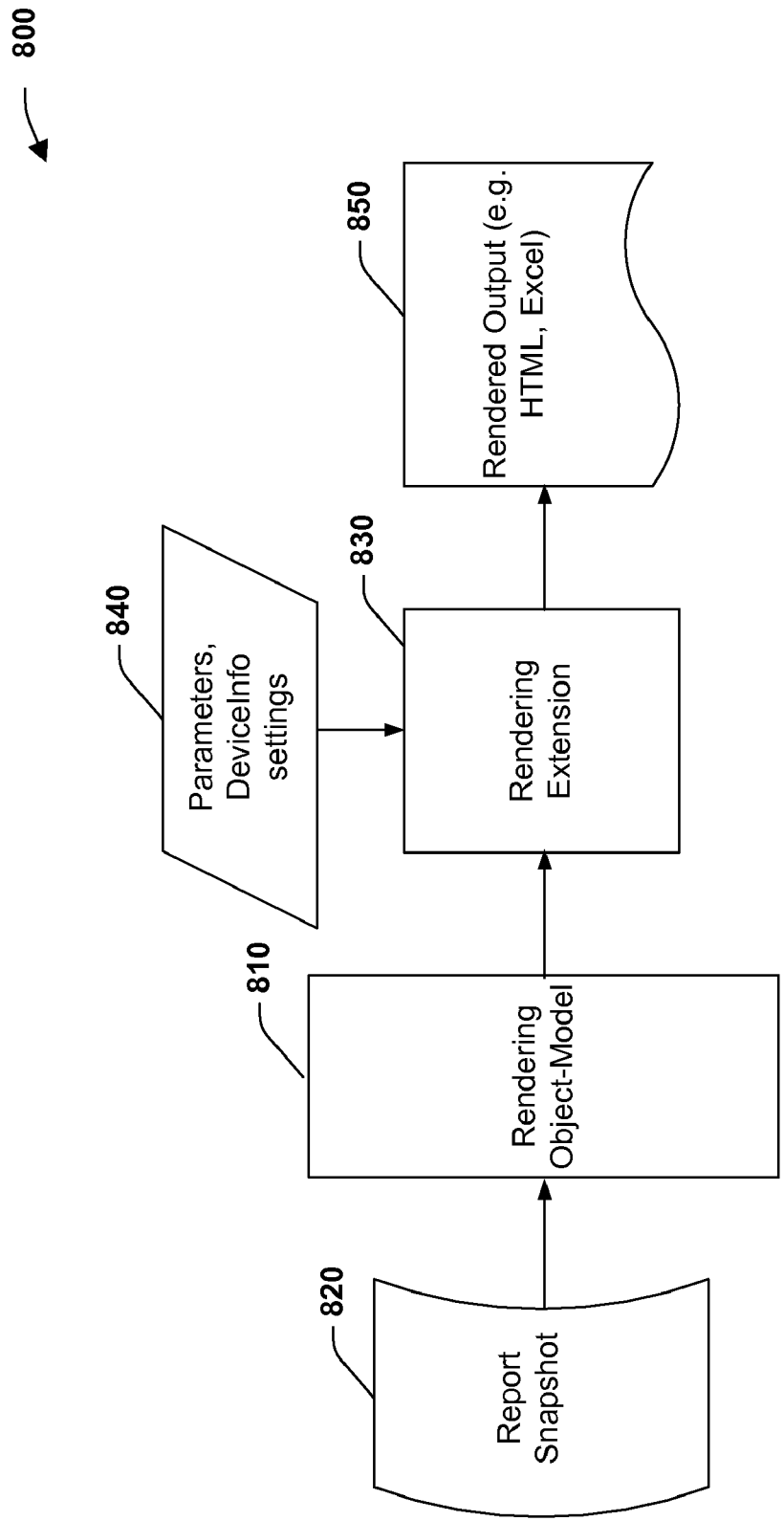
FIG. 8 illustrates an example of a prior art rendering system and object model.

Referring to FIG. 7, an example on-demand rendering system 700 is illustrated that can be employed with the dynamic object models and cursors described above. The system 700 shows a simplified view of an example model processing architecture. When a request to execute a report arrives at 710, the request is passed to the specific renderer instead of to a processing engine 730. When the renderer 720 requests data from a Rendering Object Model 734, the processing engine 730 loads the compiled definition and executes queries in the report. As an optional feature the processing engine only executes queries needed to process the currently requested item in the report. The resulting data is grouped, sorted, filtered and aggregated according to a report definition 740, but only for the top-level data region containing the current item being requested by the renderer 720. These results are flushed to a partial snapshot at 750.

Instance calculations such as report item value and style expressions are calculated on the fly as requested by the renderer 720 and are not stored in an intermediate format 760 or snapshot 750. The processing engine 730 does, however, keep a cache of the values at 770 evaluated for the current instance, used to improve performance of intra-instance expression references. This cache 770 can be cleared when a different instance is accessed. Other components in the processing architecture 730 include a data store 780, a component to fetch data 784, and a group/sort/aggregate component 790.

Dynamic object model instance classes (e.g., Text box Instance, Action Instance, Style Instance, and so forth) represent instance information based on the hierarchical cursors moving a sliding window. If a renderer accesses any GetProperty data of an instance class the following (simplified) algorithm can be applied:

If the current instance property value has been calculated previously and is currently cached:
    Return the instance property value from the cache.
    (Note: the instance cache is flushed when any of the parent cursors is moved or reset.)
Else /* on-demand processing */
    Compare the current InstancePath (i.e., hierarchical scope instance path) with the path used during the evaluation of the previous on-demand expression.
    If the paths are identical Then
        Reuse the previous On-Demand Report Object Model.
    Else /* path has changed; runtime environment needs to be prepared */
        If the report scope has changed (e.g., main report vs. sub report) and the new scope has a different (Sub) Report. Language setting then
        Update the current thread culture.
        Switch the current Report Object Model with the main/sub report of Report Object Model.
        Based on the new scope instance path, read information from the Group Tree.
        Update the current Report Object Model:
            Update group variables, populate aggregation collection (for every changed scope along the path).

Fetch the data row at the offset stored in the Group-Tree (representing the first data row of a scope/group instance) and populate the fields collection.

Update the On-Demand Processing Context with the new path.

End If

Evaluate the expression with the report runtime (including error handling) based on the current Report Object Model. Note: the evaluation of a particular expression may implicitly trigger the evaluation of dependent expressions (e.g., an expression contains a ReportItem reference to another textbox instance).

Add the expression result to the ROM instance cache.

Return the instance property value to the renderer.

End If

Given the above algorithm, the access pattern of a rendering extension is truly driving on-demand report processing. It also shows that unnecessary cursor context switches and scope path changes (without cursor context switches) can have a negative performance impact because the runtime environment should be setup correctly to enable expression evaluation by calling into an expression host assembly, for example.

In general, on-demand report processing and group tree processing are two different components within a processing engine. However, tight collaboration of the components is generally utilized to process and render a report. For example:

Group Tree processing is typically responsible for evaluating:
  group/sort/filter expressions (data grouping)
  report and group variables
  simple aggregations, post-sort aggregations, and running values
  calculating the Group Tree
  progressive group tree processing may be triggered by on-demand processing On-demand report processing is typically responsible for:
  evaluating expressions which are not already pre-evaluated by group tree processing. Particularly, textbox instance values, style expressions, interactivity, actions, and layout expressions.
  interacting with chart image rendering (based on the chart data calculations of group tree processing)
  keeping track of the on-demand processing and rendering context
  setting up the on-demand Report Object Model to enable on-demand expression evaluation based on the correct context (which can depend on the Group Tree calculated)
  image evaluation/retrieval/caching if needed On-demand report processing can be driven by a renderer accessing objects in the dynamic object model. Generally, the overall size of collections (e.g., total number of cell instances) is not known until the entire group tree structure has been processed. However, in order to render the first page of a structure with several millions cells, only a subset will be needed and the total count of items in the collection may not be relevant. On-demand report processing attempts to keep the pre-calculated and persisted information rather small to save I/O operations during rendering and evaluate items needed only once or a few times within the report as needed on-demand.

Figure 9:
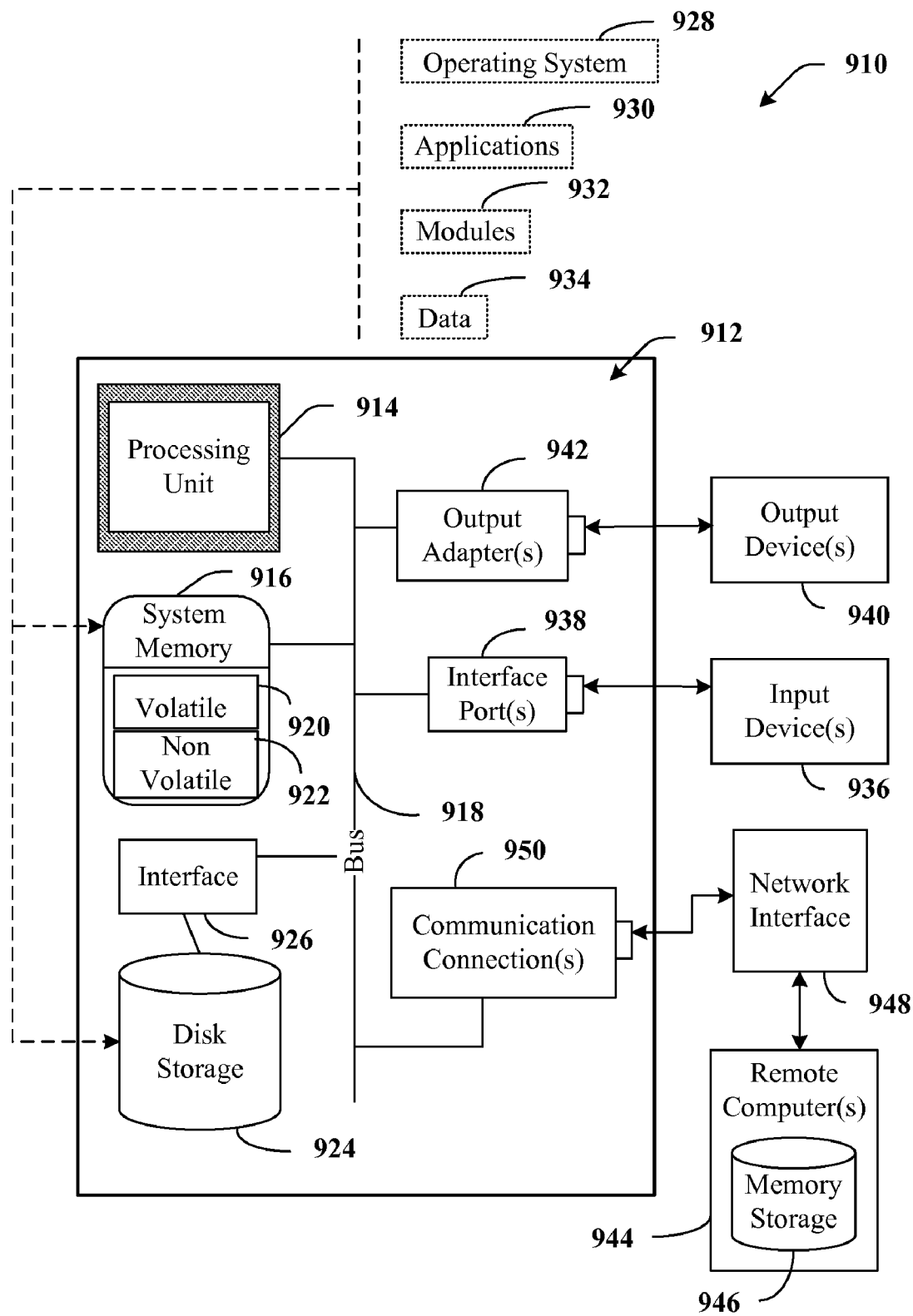
FIG. 9 is a schematic block diagram illustrating a suitable operating environment.
Figure 10:
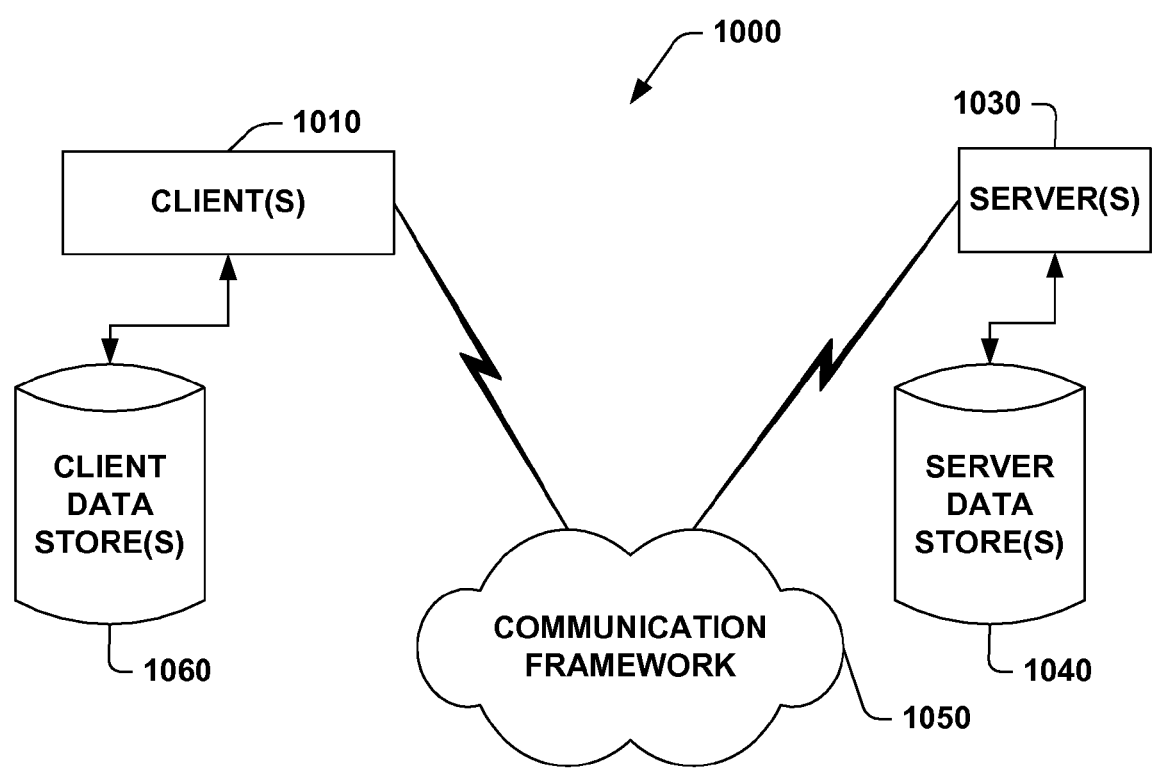
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that performs particular tasks and/or implements particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 9, an exemplary environment 910 for implementing various aspects described herein includes a computer 912. The computer 912 includes a processing unit 914, a system memory 916, and a system bus 918. The system bus 918 couple system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during startup, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/nonvolatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912 and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An object data manipulation system, the system comprising:
   one or more processors;
   system memory; and
   one or more computer storage media having stored thereon:
   a definition object model of a report displayed in a window by a report-rendering application, the report including a plurality of cells arranged in rows and columns, the definition object model including a set of dynamic group definitions over a data hierarchy, the set of dynamic group definitions including:
   a first dynamic row group identifying a first query configured to retrieve first data from the data hierarchy;
   a second dynamic row group identifying a second query configured to retrieve second data from the data hierarchy, the second query depending on the first query;
   a first dynamic column group identifying a third query configured to retrieve third data from the data hierarchy; and
   a second dynamic column group identifying a fourth query configured to retrieve fourth data from the data hierarchy, the fourth query depending on the third query; and a first cursor component associated with the first dynamic row group, the first cursor component pointing to a subset of the first data of the data hierarchy and being configured to point to a different subset of the first data of the data hierarchy in response to movement of the first cursor component within the cells of the report, the report-rendering application being configured to use the first cursor component to load the different subset of the first data of the data hierarchy into memory for further processing in response to the movement of the first cursor component;

a second cursor component associated with the second dynamic row group, the second cursor component pointing to a subset of the second data of the data hierarchy and being configured to point to a different subset of the second data of the data hierarchy in response to movement of the second cursor component within the cells of the report, the report-rendering application being configured to use the second cursor component to load the different subset of the second data of the data hierarchy into memory for further processing in response to the movement of the second cursor component;

a third cursor component associated with the first dynamic column group, the third cursor component pointing to a subset of the third data of the data hierarchy and being configured to point to a different subset of the third data of the data hierarchy in response to movement of the third cursor component within the cells of the report, the report-rendering application being configured to use the third cursor component to load the different subset of the third data of the data hierarchy into memory for further processing in response to the movement of the third cursor component; and a fourth cursor component associated with the second dynamic column group, the fourth cursor component pointing to a subset of the fourth data of the data hierarchy and being configured to point to a different subset of the fourth data of the data hierarchy in response to movement of the fourth cursor component within the cells of the report, the report-rendering application being configured to use the fourth cursor component to load the different subset of the fourth data of the data hierarchy into memory for further processing in response to the movement of the fourth cursor component.

2. The system of claim 1, wherein the cursor component is associated with a dynamic group definition of the set of dynamic group definitions.

3. The system of claim 1, wherein the cursor component operates in a forward only mode or in a direct position mode.

4. The system of claim 1, further comprising a component to maintain state for the cursor components, where the cursor components are moved until there are no longer any dynamic group instances.

5. The system of claim 1, further comprising a component to maintain an intrinsic hierarchical relationship between multiple cursor components.

6. The system of claim 5, wherein the processing engine includes at least one of a report definition, a snapshot component, a format component, a cache component, a sort component, a group component, an aggregate component, and a fetch component.

7. The system of claim 1, further comprising a processing engine that is employed with the cursor components or the definition object model.

8. The system of claim 1, wherein the location of the second cursor component is configured to automatically reset to a new cell of the report in response to the movement of the first cursor component within the cells of the report.

9. A computer system comprising:
one or more processors;
system memory; and
one or more computer storage media having stored thereon:
a data hierarchy;
a report configured to display data in a plurality of cells arranged in rows and columns, the report including a plurality of dynamic group definitions, the plurality of dynamic group definitions including:
a first dynamic row group identifying a first query configured to retrieve first data from the data hierarchy;
a second dynamic row group identifying a second query configured to retrieve second data from the data hierarchy, the second query depending on the first query;
a first dynamic column group identifying a third query configured to retrieve third data from the data hierarchy; and
a second dynamic column group identifying a fourth query configured to retrieve fourth data from the data hierarchy, the fourth query depending on the third query;
a report-rendering application configured to display the report;
a first cursor component associated with the first dynamic row group, the first cursor component pointing to a subset of the first data of the data hierarchy and being configured to point to a different subset of the first data of the data hierarchy in response to movement of the first cursor component between cells of the report, the report-rendering application being configured to use the first cursor component to load the different subset of the first data of the data hierarchy into memory for display in the report in response to the movement of the first cursor component between cells of the report;
a second cursor component associated with the second dynamic row group, the second cursor component pointing to a subset of the second data of the data hierarchy and being configured to point to a different subset of the second data of the data hierarchy in response to movement of the second cursor component between cells of the report, the report-rendering application being configured to use the second cursor component to load the different subset of the second data of the data hierarchy into memory for display in the report in response to the movement of the second cursor component between cells of the report;
a third cursor component associated with the first dynamic column group, the third cursor component pointing to a subset of the third data of the data hierarchy and being configured to point to a different subset of the third data of the data hierarchy in response to movement of the third cursor component between cells of the report, the report-rendering application being configured to use the third cursor component to load the different subset of the third data of the data hierarchy into memory for display in the report in response to the movement of the third cursor component between cells of the report; and a fourth cursor component associated with the second dynamic column group, the fourth cursor component pointing to a subset of the fourth data of the data hierarchy and being configured to point to a different subset of the fourth data of the data hierarchy in response to movement of the fourth cursor component between cells of the report, the report-rendering application being configured to use the fourth cursor component to load the different subset of the fourth data of the data hierarchy into memory for display in the report in response to the movement of the fourth cursor component between cells of the report.

10. The computer system as in claim 9, wherein the report-rendering application is configured to, in response to the navigation within the window, request and display the second subset of the data hierarchy in a window.

11. The computer system as in claim 9, wherein the report-rendering application is configured to, in response to scrolling movement of the window between positions within the report, request and display the second subset of the data hierarchy in a window.

12. The computer system as in claim 9, wherein the location of the second cursor component is configured to automatically reset to a new cell of the report in response to the movement of the first cursor component between cells of the report.

13. A method performed by a computer system one or more processors and system memory, the method comprising:
providing a data hierarchy;
providing a report configured to display data in a plurality of cells arranged in rows and columns, the report including a plurality of dynamic group definitions, the plurality of dynamic group definitions including:
    a first dynamic row group identifying a first query configured to retrieve first data from the data hierarchy;
    a second dynamic row group identifying a second query configured to retrieve second data from the data hierarchy, the second query depending on the first query;
    a first dynamic column group identifying a third query configured to retrieve third data from the data hierarchy; and
    a second dynamic column group identifying a fourth query configured to retrieve fourth data from the data hierarchy, the fourth query depending on the third query;
providing a report-rendering application configured to display the report;
providing a first cursor component associated with the first dynamic row group, the first cursor component pointing to a subset of the first data of the data hierarchy and being configured to point to a different subset of the first data of the data hierarchy in response to movement of the first cursor component between cells of the report, the report-rendering application being configured to use the first cursor component to load the different subset of the first data of the data hierarchy into memory for display in the report in response to the movement of the first cursor component between cells of the report;

providing a second cursor component associated with the second dynamic row group, the second cursor component pointing to a subset of the second data of the data hierarchy and being configured to point to a different subset of the second data of the data hierarchy in response to movement of the second cursor component between cells of the report, the report-rendering application being configured to use the second cursor component to load the different subset of the second data of the data hierarchy into memory for display in the report in response to the movement of the second cursor component between cells of the report;

providing a third cursor component associated with the first dynamic column group, the third cursor component pointing to a subset of the third data of the data hierarchy and being configured to point to a different subset of the third data of the data hierarchy in response to movement of the third cursor component between cells of the report, the report-rendering application being configured to use the third cursor component to load the different subset of the third data of the data hierarchy into memory for display in the report in response to the movement of the third cursor component between cells of the report; and providing a fourth cursor component associated with the second dynamic column group, the fourth cursor component pointing to a subset of the fourth data of the data hierarchy and being configured to point to a different subset of the fourth data of the data hierarchy in response to movement of the fourth cursor component between cells of the report, the report-rendering application being configured to use the fourth cursor component to load the different subset of the fourth data of the data hierarchy into memory for display in the report in response to the movement of the fourth cursor component between cells of the report.

14. The method of claim 13, wherein the location of the second cursor component is configured to automatically reset to a new cell of the report in response to the movement of the first cursor component between cells of the report.

* * * * *